Sept. 2, 1924.  1,507,522

R. C. SIMON

COLANDER

Filed June 21, 1923

WITNESSES

INVENTOR
R.C. SIMON

BY

ATTORNEYS

Patented Sept. 2, 1924.

1,507,522

UNITED STATES PATENT OFFICE.

ROSE C. SIMON, OF NEW YORK, N. Y.

COLANDER.

Application filed June 21, 1923. Serial No. 646,881.

*To all whom it may concern:*

Be it known that I, ROSE C. SIMON, a citizen of the United States, and a resident of the city of New York, borough of Manhattan, in the county and State of New York, have invented new and useful Improvements in Colanders, of which the following is a full, clear, and exact description.

This invention relates to colanders.

Colanders of the ordinary type are not provided with means for retaining them firmly in position on containers with which they may be used. If no means is provided for gripping the container the colander is likely to slide about when subjected to a force not applied along vertical lines. This often results in accidents which cause the housewife a great deal of unnecessary labor and trouble. Further, if the colander is not provided with some means for engaging the container with which it is to be used it usually seats too low in the container making it impossible for it to complete the work for which it was intended without raising it from the vessel. In order to overcome these defects the colander to be described in the subsequent paragraphs of this application was designed.

The general object of this invention is the provision of a simply constructed and efficient colander provided with means for firmly supporting it in position on containers of different sizes and for supporting it above flat surfaces on which it may be positioned.

This object is accomplished by providing a vessel with a perforated bottom, preferably of hemispherical shape, mounting on the vessel near the junction of the side walls and the bottom an annular member having a plurality of circumferential grooves in its lower face, and forming integral with said annular member a depending rim that projects below the bottom of the vessel.

This and other objects of the invention will be more clearly understood from the following detailed description and accompanying drawings.

Figure 1:
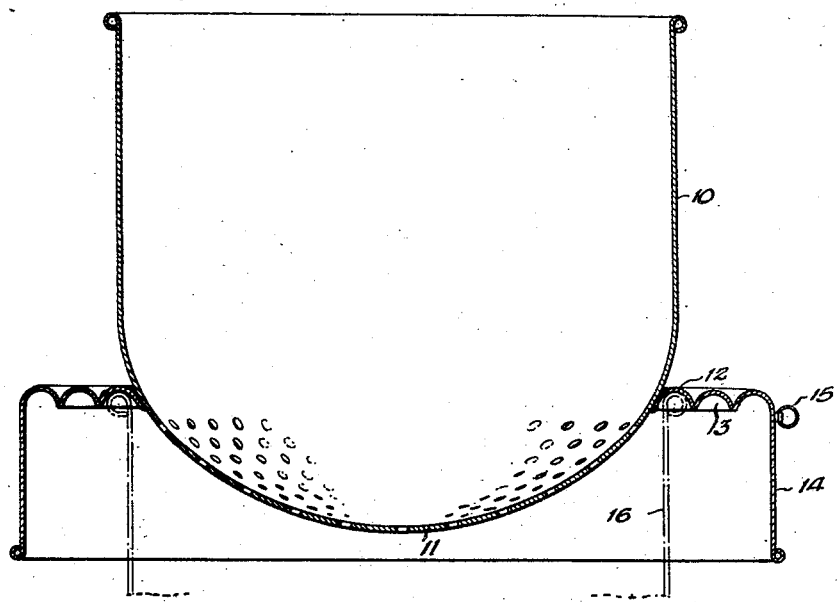
Figure 1 is a vertical cross section through the colander showing its construction.
Figure 2:
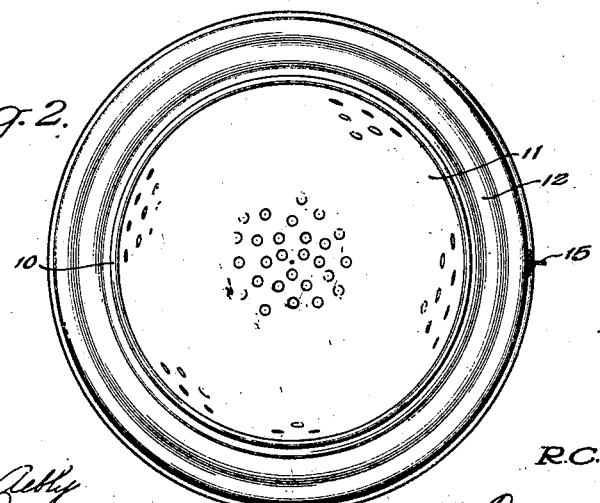
Figure 2 is a top plan view of the colander.

Referring to the above-mentioned drawings, the invention includes a vessel 10 having a hemispherical-shaped perforated bottom 11. An annular member 12 having a plurality of circumferential grooves 13 in its lower face is mounted on the vessel near the line of juncture of the side walls with the perforated bottom. This annular member may be attached in a variety of manners such as soldering or riveting. Formed integral with the annular member, depending therefrom, is a rim 14 which extends below the bottom 11 of the colander. This rim is not always necessary since the colander constructed with the annular member 12 would serve for firmly positioning the colander on any container. A ring 15 is attached to the rim 14, presenting a means for suspending the colander from any support that may be provided.

In using this colander, it is placed on the top of any container 16, such as shown by the dot and dash lines in Figure 1. One of the circumferential grooves 13 will receive the upper edge of the container, as shown in the figure. This firmly positions the colander on the container so that it will not slide about when a force is applied to one side of the vessel 16. The plurality of circumferential grooves 13 are provided so as to accommodate the colander to vessels of different sizes. Since most cooking vessels and containers used are circular in shape the colander would normally be made with the annular member 12 but, if necessary, the colander might be made square with a hollow rctangular plate, provided with grooves in its lower face, attached thereto.

If the rim 14 is not provided and the colander is set on a table or other support having a flat surface the tendency is to dint the perforated bottom. With the depending rim 14 provided the colander may be rested on a flat surface, the rim serving to support the vessel 10 above the surface. It also prevents the possibility of striking the perforated bottom on the flat surface when the colander is being positioned on a table or the like.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. The combination with a colander having a spherical bottom portion, of means for supporting the same from the upper end of a vessel, comprising an annular flange having a plurality of concentric corrugations for engaging and embracing the upper edge of the vessel to which it is applied, the wall of the central corrugation forming an arcuate support for the spherical bottom of the colander.

2. As a new article of manufacture, a colander including a body having a spherical lower portion, and means for supporting the same from the upper end of a vessel which receives the contents of the colander comprising an annular laterally projecting flange carried by the body of the colander, said flange having a plurality of concentric annular corrugations arranged in the same plane for engaging and embracing the upper edges of vessels of various diameters the inner wall of the central corrugation forming a tapered shoulder for supporting the spherical bottom of the colander.

ROSE C. SIMON.